United States Patent
Kishi

(10) Patent No.: US 11,326,075 B2
(45) Date of Patent: May 10, 2022

(54) COAT-FORMING COMPOSITION

(71) Applicant: THREEBOND CO., LTD., Hachioji (JP)

(72) Inventor: Katsuhiko Kishi, Hachioji (JP)

(73) Assignee: THREEBOND CO., LTD., Tokyo (JP)

( * ) Notice: Subject to any disclaimer, the term of this patent is extended or adjusted under 35 U.S.C. 154(b) by 170 days.

(21) Appl. No.: 16/631,027

(22) PCT Filed: Jul. 24, 2018

(86) PCT No.: PCT/JP2018/027769
§ 371 (c)(1),
(2) Date: Jan. 14, 2020

(87) PCT Pub. No.: WO2019/022093
PCT Pub. Date: Jan. 31, 2019

(65) Prior Publication Data
US 2020/0140718 A1 May 7, 2020

(30) Foreign Application Priority Data

Jul. 25, 2017 (JP) .............................. JP2017-143605

(51) Int. Cl.
C09D 183/06 (2006.01)
C09D 7/20 (2018.01)
C08G 77/06 (2006.01)
C08G 77/18 (2006.01)
C08G 77/00 (2006.01)

(52) U.S. Cl.
CPC ........... *C09D 183/06* (2013.01); *C08G 77/06* (2013.01); *C08G 77/18* (2013.01); *C09D 7/20* (2018.01); *C08G 77/70* (2013.01)

(58) Field of Classification Search
None
See application file for complete search history.

(56) References Cited

U.S. PATENT DOCUMENTS

| | | | | |
|---|---|---|---|---|
| 5,326,387 A * | 7/1994 | Faber | ........................ | C07F 7/21 106/287.11 |
| 5,330,787 A * | 7/1994 | Berlin | ...................... | C09G 1/12 106/10 |
| 5,716,443 A | 2/1998 | Kijima et al. | | |
| 5,913,969 A * | 6/1999 | Howe | ....................... | C09G 1/16 106/2 |
| 6,221,433 B1 * | 4/2001 | Muntz | .................. | C09D 183/04 106/287.13 |
| 6,548,465 B2 * | 4/2003 | Perry | ........................ | D06L 1/04 510/285 |
| 2006/0054053 A1 * | 3/2006 | Masutani | ............. | C09D 183/10 106/2 |
| 2012/0034456 A1 * | 2/2012 | Hasegawa | ............ | C09D 183/04 428/336 |
| 2017/0349783 A1 | 12/2017 | Kirino | | |
| 2019/0077904 A1 * | 3/2019 | Baek | ........................ | C08L 75/16 |
| 2020/0231452 A1 * | 7/2020 | Takayasu | ............ | C01B 33/1585 |
| 2021/0087442 A1 * | 3/2021 | Watanabe | ................. | C09J 11/04 |

FOREIGN PATENT DOCUMENTS

| | | |
|---|---|---|
| JP | H09-157546 A | 6/1997 |
| JP | H10-036771 A | 2/1998 |
| JP | 2003-206478 A | 7/2003 |
| JP | 2007-161988 A | 6/2007 |
| JP | 2007-270071 A | 10/2007 |
| JP | 2009-138063 A | 6/2009 |
| JP | 2013-194058 A | 9/2013 |
| JP | 2014-065771 A | 4/2014 |
| WO | 2016/104445 A1 | 6/2016 |
| WO | WO-2016104445 A1 * | 6/2016 ........... C09D 183/04 |

OTHER PUBLICATIONS

English translation of International Search Report dated Oct. 9, 2018 and Written Opinion in corresponding International Application No. PCT/JP2018/027769; 12 pages.

* cited by examiner

*Primary Examiner* — Robert S Loewe
(74) *Attorney, Agent, or Firm* — Maier & Maier, PLLC

(57) ABSTRACT

A coat-forming composition including (A) to (C) below, and containing 100 to 2000 parts by mass of (C) below relative to 100 parts by mass of (A) below: (A) a mixture of coating film-forming components containing (A-1) and (A-2) below at a mass ratio of (A-1):(A-2)=1:1.1 to 1:4.9, (A-1) a hydrolyzable group-containing silicone oligomer having a kinematic viscosity at 25° C. of 10 mm2s-1 or less, and (A-2) a reactive silicone oil having, at one terminal, a functional group from the group of a mercapto group, an amino group, and a monocarbinol group, provided that the reactive silicone oil having a monocarbinol group at one terminal has a functional group equivalent of 4500 g/mol or less; (B) a hydrolysis catalyst; and (C) an organic solvent. The coat-forming composition can form a coating film having both water sliding ability and durability (water sliding ability after abrasion).

11 Claims, No Drawings

COAT-FORMING COMPOSITION

FIELD

The present invention relates to a coat-forming composition. More specifically, the present invention relates to a coat-forming composition by which a thin-film coating layer for providing water sliding ability and durability particularly to a metal surface, a coated surface, a resin surface, or the like of a car body of an automobile or a train vehicle can be obtained.

BACKGROUND

Solid, semi-solid or liquid coat-forming compositions have conventionally been coated on or applied to a coated steel plate of an automobile body and the like for the purpose of protection and aesthetic improvement. As such a coat-forming composition, a composition obtained by adding to a moisture-curable polyorganosiloxane, an organic solvent and a hydrolysis catalyst, a volatile polyorganosiloxane oil and a volatile polydimethylsiloxane (Patent Document 1: JP H10-36771 A); or a high-viscosity silicone gum (Patent Document 2: JP 2013-194058 A) have been known, for example. However, these compositions were difficult to exhibit water sliding characteristics for a long time, because the non-reactive polyorganosiloxane oil volatilized and dissipated over time.

To solve the problem mentioned above, various compositions each comprising a moisture-curable silicone oligomer, an organic solvent, a hydrolysis catalyst, and a silicone oil having a reactive functional group in the molecule have been proposed. Patent Literature 3 (JP 2007-270071 A) discloses a coating composition comprising a mixture of a water-curable silicone resin and a specific hydrolyzable curing agent component, an organic solvent, and polytetrafluoroethylene with a specific molecular weight. Patent Literature 4 (JP 2009-138063 A) discloses a surface water-repellent protective agent comprising a moisture-curable liquid silicone oligomer, polydimethylsiloxane having silanol groups in both terminal groups, a volatile solvent, etc. Patent Literature 5 (JP 2014-065771 A) discloses a coating material for a vehicle comprising a silicone alkoxy oligomer, a silicone oil having a carbinol group at one terminal of the molecular chain, a specific organic solvent, a hydrolysis catalyst, etc.

SUMMARY

However, in the composition of Patent Literature 3 (JP 2007-270071 A), the water-curable silicone resin is the only reactive high molecular component, and there is still a problem with the durability (water sliding ability after abrasion) of the coating film. In the composition of Patent Literature 4 (JP 2009-138063 A), since reactive high molecular components include not only a moisture-curable liquid silicone oligomer but also polydimethylsiloxane having silanol groups in both terminal groups, durability is improved, but there arises a problem that hydrophilicity would be too large and water sliding ability would be too large (a water sliding angle would be too small). In the composition of Patent Literature 5 (JP 2014-065771A), the compatibility of the entire system is low, and there has been a harmful effect in which separation or the like occurs during preparation or during storage.

Accordingly, an object of the present invention is to provide a coat-forming composition that forms a coating film excellent in water sliding ability and durability (water sliding ability after abrasion). Further, another object of the present invention is to provide a coat-forming composition in which components contained therein are less likely to separate during preparation or/and during storage.

As described above, in the conventional coat-forming compositions, it has been difficult to satisfy necessary characteristics at the same time. The present inventor has conducted extensive studies in order to improve these characteristics, to find that the problem mentioned above can be solved by using a coat-forming composition having the following constitution.

Specifically, according to a first aspect of the present invention, is provided a coat-forming composition comprising (A) to (C) below, and containing 100 to 2000 parts by mass of (C) below relative to 100 parts by mass of (A) below:

(A) a mixture of coating film-forming components containing (A-1) and (A-2) below at a mass ratio of (A-1):(A-2)=1:1.1 to 1:4.9, (A-1) a hydrolyzable group-containing silicone oligomer having a kinematic viscosity at 25° C. of 10 mm$^2$s$^{-1}$ or less, and (A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less;

(B) a hydrolysis catalyst; and (C) an organic solvent.

Further, the present invention involves also the following aspects.

According to a second aspect, is provided the coat-forming composition according to the first aspect, wherein the (A-1) is a partial hydrolysis condensate of an alkoxysilane compound represented by Formula (1) below which has a kinematic viscosity at 25° C. of 10 mm$^2$s$^{-1}$ or less:

[Chemical Formula 1]

$$R^1{}_x\text{—Si(OR}^2)_{4-x} \quad\quad\quad \text{Formula (1)}$$

In the Formula (1), $R^1$ and $R^2$ each independently represent an aliphatic hydrocarbon group having 1 to 8 carbon atoms, an alicyclic hydrocarbon group having 3 to 10 carbon atoms, or an aromatic hydrocarbon group having 6 to 10 carbon atoms that optionally has a substituent, and x is an integer of 0 to 3.

According to a third aspect, is provided the coat-forming composition according to the first aspect or the second aspect, wherein the (C) comprises at least one selected from the group consisting of an alcohol compound, a ketone compound, an ester compound, an ether compound, a hydrocarbon compound, and a halogenated hydrocarbon compound.

According to a fourth aspect, is provided the coat-forming composition according to any one of the first aspect to the third aspect, wherein the (C) comprises an alcohol compound.

According to a fifth aspect, is provided the coat-forming composition according to any one of the first aspect to the forth aspect, wherein the (B) is a phosphoric acid compound.

According to a sixth aspect, is provided the coat-forming composition according to any one of the first aspect to the fifth aspect, wherein the coat-forming composition is used for forming a coating film on a surface of a steel plate or a coated steel plate.

According to a seventh aspect, is provided the coat-forming composition according to the sixth aspect, wherein the steel plate or the coated steel plate is a car body of an automobile.

According to an eighth aspect, is provided a method for forming a coating film comprising applying the coat-forming composition set forth in any one of the first aspect to the fifth aspect to a surface of a car body of a steel plate or a coated steel plate, volatilizing the (C) at normal temperature or in a heated environment, and then further performing dry wiping, or further performing wiping with water and then performing dry wiping.

According to a ninth aspect, is provided the method for forming a coating film according to the eighth aspect, wherein the steel plate or the coated steel plate is a car body of an automobile.

According to a tenth aspect, is provided a cured coating film obtained by curing the coat-forming composition cured coating film obtained by curing the coat-forming composition set forth in any one of the first aspect to the seventh aspect.

According to an eleventh aspect, is provided a method for manufacturing a coat-forming composition, which method comprises mixing (A-1) a hydrolyzable group-containing silicone oligomer having a kinematic viscosity at 25° C. of 10 mm$^2$s$^{-1}$ or less, (A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less, (B) a hydrolysis catalyst, and (C) an organic solvent, wherein the method involves mixing the (A-1) and the (A-2) at a mass ratio of (A-1): (A-2)=1:1.1 to 1:4.9, and the coat-forming composition contains 100 to 2000 parts by mass of the (C) relative to 100 parts by mass as a total amount of the (A-1) and the (A-2).

DETAILED DESCRIPTION

Hereinbelow, embodiments of the present invention will be described. Note that the present invention is not limited to the following embodiments. Further, unless otherwise specified, operation and measurement of physical properties etc. are performed under conditions of room temperature (in the range of 20° C. to 25° C.) and a relative humidity of 40 to 50% RH.

According to the first aspect of the present invention, is provided a coat-forming composition comprising (A) to (C) below, wherein (C) below is included in an amount of 100 to 2000 parts by mass relative to 100 parts by mass of (A) below:

(A) a mixture of coating film-forming components comprising (A-1) and (A-2) below at a mass ratio of (A-1):(A-2)=1:1.1 to 1:4.9,
  (A-1) a hydrolyzable group-containing silicone oligomer having a kinematic viscosity at 25° C. of 10 mm$^2$s$^{-1}$ or less, and
  (A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less;
(B) a hydrolysis catalyst; and
(C) an organic solvent.

By using the coat-forming composition, a coating film having both water sliding ability and durability (water sliding ability after abrasion) can be formed on a steel plate or a coated steel plate (for example, a car body of an automobile or the like).

Hereinbelow, details of the present invention will be described.

[Coat-Forming Composition]

<Component (A)>

The component (A) contained in the coat-forming composition of the present invention is a mixture of coating film-forming components that contains components (A-1) and (A-2) below at a mass ratio of (A-1): (A-2)=1:1.1 to 1:4.9.

[Component (A-1)]

The component (A-1) is a hydrolyzable group-containing silicone oligomer having a kinematic viscosity at 25° C. that is measured by a viscosity measurement method using a single cylindrical rotational viscometer (a B-type viscometer) in accordance with JIS Z 8803:2011 of 10 mm$^2$s$^{-1}$ or less (the lower limit: 0 mm$^2$s$^{-1}$). The component is presumed to be a component that contributes mainly to exhibition of water sliding ability in a cured coating film formed from the coat-forming composition of the present invention.

Here, as the "hydrolyzable group", an alkoxy group, an alkenyloxy group, an acyloxy group, an aminooxy group, an oxime group, an amide group, and the like are cited. In particular, it is preferable that the hydrolyzable group contained in the silicone oligomer be an alkoxy group, from the point of easy handling.

Here, the hydrolyzable group-containing silicone oligomer is a polymer obtained by partially hydrolyzing a silane compound having a hydrolyzable group by using a known catalyst such as an acid, a base, an organic tin compound, an organic titanium compound, or the like to perform condensation (in the present description, also referred to as "partial hydrolysis condensation"), and is a silicone compound having, at a molecular chain terminal, in a side chain, or the like, a hydrolyzable group derived from the silane compound mentioned above, having a weight-average molecular weight between 550 and 20,000, and having a straight-chain structure, a branched structure, or a three-dimensional network structure.

Note that, in the present description, a value measured by gel permeation chromatography (GPC) with polystyrene as a standard substance is employed as the "weight-average molecular weight". Note that the measurement conditions are as follows:

«Measurement Conditions»

Column: TSKgel (registered trademark) SuperMultipore HZ-M (manufactured by Tosoh Corporation)

Flow rate: 0.35 mL/minute

Column temperature: 40° C.

Eluent: THF

Sample: A solution in which the oligomer was dissolved in THF so as to give a ratio of 0.1 mass % relative to 100 g of THF was used in the measurement.

As preferred examples of the silane compound having a hydrolyzable group for obtaining the silicone compound mentioned above (the silicone oligomer), polyfunctional alkoxysilane compounds such as dialkoxysilane compounds, trialkoxysilane compounds, tetraalkoxysilane compounds, and the like, and monoalkoxysilane compounds (monofunctional alkoxysilane compounds) are cited. The silane compounds mentioned above may be used singly, or two or more of them may be used in combination.

Thus, it is preferable that the hydrolyzable group-containing silicone oligomer as component (A-1) be a partial hydrolysis condensate of an alkoxysilane compound represented by the Formula (1) below. Thus, in an embodiment of the present invention, the component (A-1) is a partial hydrolysis condensate of an alkoxysilane compound represented by the Formula (1) below in which a kinematic viscosity at 25° C. is in the range of less than or equal to 10 mm$^2$s$^{-1}$. The partial hydrolysis condensate may be obtained by using only one of the alkoxysilane compounds represented by the Formula (1) below, or may be obtained by combining two or more of them.

[Chemical Formula 2]

$$R^1_x\text{—Si}(OR^2)_{4-x} \qquad \text{Formula (1)}$$

In the Formula (1), $R^1$ and $R^2$ each independently represent an aliphatic hydrocarbon group having 1 to 8 carbon atoms, an alicyclic hydrocarbon group having 3 to 10 carbon atoms, or an aromatic hydrocarbon group having 6 to 10 carbon atoms that optionally has a substituent. When these groups have a substituent(s), the substituent is not particularly limited, and an alkyl group, an alkenyl group, an aryl group, a halogen atom, a nitro group, a cyano group, a hydroxy group, a carboxy group, and the like may be cited. Note that, in the above, the group is not substituted with the same substituent. For example, a substituted alkyl group is not substituted with an alkyl group.

$R^1$ and $R^2$ are preferably each independently a substituent selected from the group consisting of an aliphatic hydrocarbon group having 1 to 5 carbon atoms that optionally has a substituent and an aromatic hydrocarbon group having 6 to 10 carbon atoms that optionally has a substituent, more preferably each independently a substituent selected from the group consisting of a methyl group, an ethyl group, a propyl group, and a phenyl group, still more preferably each independently a methyl group or a phenyl group, and particularly preferably a methyl group. In the Formula (1), when there are a plurality of $R^1$'s, these may be the same or different, but are preferably the same. Further, this similarly applies to $R^2$.

In the Formula (1), x represents an integer of 0 to 3. When an alkoxysilane compound represented by the Formula (1) is used singly, x is preferably an integer of 0 to 2, and more preferably 1 or 2. Further, when two or more alkoxysilane compounds are used, it is preferable that at least a first alkoxysilane compound in which x is an integer of 1 to 3 and a second alkoxysilane compound in which x is an integer of 0 to 3 be used in combination (provided that a form in which x is 3 in both the first alkoxysilane compound and the second alkoxysilane compound is excluded).

When a compound satisfying only the feature of component (A-1) and a compound having the features of both components (A-1) and (A-2) are used in combination, the former is categorized into component (A-1) and the latter into component (A-2).

As a method for manufacturing component (A-1), a method which comprising adding a known hydrolysis catalyst to a compound represented by the Formula (1), stirring the resultant mixture while warming is performed in the presence of water, to perform partial hydrolysis condensation can be used; but the manufacturing method is not limited to this.

Here, in the Formula (1), when x is 0 or 1, and a main skeleton of the polymer of the alkoxysilane compound is a straight chain, alkoxy groups represented by (OR$^2$) are present in a side chain. Further, when a main skeleton of the polymer is not a straight-chain structure but forms a branched structure or a three-dimensional crosslinked body, an alkoxy group (s) represented by (OR$^2$) are partially contained in the structure. In the Formula (1), the alkoxysilane compounds may include one in which x is 2 or 3; however, in order to effectively make alkoxy groups present in the structure of component (A-1), it is preferable that x be 0 or 1 in the Formula (1). Further, in the Formula (1), only an alkoxysilane compound in which x is 3 cannot form a polymer; thus, when an alkoxysilane compound in which x is 3 is included, also one in which x is in the range of 0 to 2 is used in combination for the partial hydrolysis condensation.

Here, the component (A-1) has no particular restrictions as long as it has a kinematic viscosity at 25° C. measured by the method mentioned above is 10 mm$^2$s$^{-1}$ or less (the lower limit: 0 mm$^2$s$^{-1}$), and may contain an organic group in the molecular structure to the extent that the action of the present invention is not inhibited. Further, as the component (A-1), one that is mixed with a component such as a hydrolysis catalyst for curing the component (A-1) etc. in advance may be used.

From the viewpoint of achieving both water sliding ability and durability at a higher level, the component (A-1) has preferably the kinematic viscosity at 25° C. measured by the method mentioned above of more than or equal to 0.01 mm$^2$s$^{-1}$ and less than or equal to 8 mm$^2$s$^{-1}$, more preferably more than or equal to 0.05 mm$^2$s$^{-1}$ and less than or equal to 6 mm$^2$s$^{-1}$, still more preferably more than or equal to 0.10 mm$^2$s$^{-1}$ and less than or equal to 4 mm$^2$s$^{-1}$, and particularly preferably more than or equal to 0.15 mm$^2$s$^{-1}$ and less than or equal to 2 mm$^2$s$^{-1}$.

As the component (A-1), either a synthetic product or a commercially available product may be used as long as it is a silicone oligomer having the characteristics mentioned above. As the commercially available product, for example, KC-89S (manufactured by Shin-Etsu Chemical Co., Ltd.; a partial hydrolysis condensate of an alkoxysilane compound in which the kinematic viscosity at 25° C. is 5 mm$^2$s$^{-1}$, and both $R^1$ and $R^2$ are a methyl group and x is an integer of 0 to 3 in the Formula (1)), KR-515 (a product of Shin-Etsu Chemical Co., Ltd.; a partial hydrolysis condensate of an alkoxysilane compound in which the kinematic viscosity at 25° C. is 7 mm$^2$s$^{-1}$, and both $R^1$ and $R^2$ are a methyl group and x is an integer of 0 to 3 in the Formula (1)), X-40-2327 (manufactured by Shin-Etsu Chemical Co., Ltd.; a mixture of a partial hydrolysis condensate of an alkoxysilane compound in which the kinematic viscosity at 25° C. is 0.6 mm$^2$s$^{-1}$, and both $R^1$ and $R^2$ are a methyl group and x is an integer of 0 to 3 in the Formula (1), and a phosphoric acid-based hydrolysis catalyst), KR-400F (manufactured by Shin-Etsu Chemical Co., Ltd.; a mixture of a partial hydrolysis condensate of an alkoxysilane compound in which the kinematic viscosity at 25° C. is 1.2 mm$^2$s$^{-1}$, and $R^1$ is a methyl group or a fluorine-substituted alkyl group, $R^2$ is a methyl group, and x is an integer of 0 to 3 in the Formula (1), and a titanium-based hydrolysis catalyst), XC96-B0446 (a product of Momentive Performance Materials Japan LLC; a partial hydrolysis condensate of an alkoxysilane compound in which the kinematic viscosity at 25° C. is 4.5 mm$^2$s$^{-1}$, and both $R^1$ and $R^2$ are a methyl group and x is an integer of 0 to 3 in the Formula (1)), and the like can be cited. These may be used singly, or a plurality of kinds may be used in combination.

[Component (A-2)]

The component (A-2) is a reactive silicone oil having, at one terminal, a functional group selected from the group consisting of a mercapto group, an amino group, and a monocarbinol group (at this time, a functional group equivalent is less than or equal to 4500 g/mol in the reactive silicone oil having a monocarbinol group at one terminal). The component is presumed to be a component that, in a cured coating film formed from the coat-forming composition of the present invention, contributes mainly to the enhancement of the strength of the cured coating film and the exhibition of durability (abrasion resistance). Note that a silicone oil having the functional group mentioned above at both terminals is not included in component (A-2). Further, it is assumed that a silicone oil having the functional group mentioned above at one terminal and in a side chain is included in the component (A-2).

In the present description, "having a monocarbinol group at one terminal" means that only one carbinol group (—ROH) is linked to the Si atom at one terminal. At this time, R represents a group in which alkylene groups having 1 to 10 carbon atoms and an ether linkage are connected together like, for example, —(CH$_2$)$_3$—O—(CH$_2$)$_2$—. However, the ether oxygen is not linked to the OH group.

As the alkylene group having 1 to 10 carbon atoms, a methylene group, an ethylene group, a trimethylene group, a tetramethylene group, a propylene group, a pentamethylene group, a hexamethylene group, a heptamethylene group, an octamethylene group, and the like are cited.

As used herein, the "functional group equivalent" is a value calculated by the formula mentioned below. In the formula mentioned below, a hydroxyl value is a value measured in accordance with JIS K 0070:1992 (a neutralization titration method). From the viewpoint of improving the effect of the present invention more, the functional group equivalent of the reactive silicone oil having a monocarbinol group at one terminal is preferably 500 to 4000 g/mol, more preferably 1000 to 3500 g/mol, and still more preferably 2000 to 3200 g/mol. That is, the hydroxyl value is preferably 14 to 112 mg KOH/g, more preferably 16 to 56 mg KOH/g, and still more preferably 17.5 to 28 mg KOH/g.

Functional group equivalent [g/mol]=56000/hydroxyl value [mg KOH/g]   [Mathematical Formula 1]

In particular, from the viewpoint of achieving both water sliding ability and durability at a high level, it is preferable that the component (A-2) include a reactive silicone oil having a mercapto group at one terminal.

Here, the silicone oil may be in a straight-chain form (a form in which no silicone chains are grafted on a silicone main chain), or may be in a branched form (a form in which a silicone chain is grafted on a silicone main chain), but is preferably in a straight-chain form.

As the straight-chain-form silicone oil, polydimethylsiloxane, polymethylphenylsiloxane, and the like may be cited, and the straight-chain-form silicone oil is preferably polydimethylsiloxane (dimethyl silicone oil).

That is, in an embodiment of the present invention, from the viewpoint of achieving both water sliding ability and durability at a higher level, it is preferable that the component (A-2) be at least one of polydimethylsiloxane in which one terminal is modified with a mercapto group, polydimethylsiloxane in which one terminal is modified with an amino group, and polydimethylsiloxane in which one terminal is modified with one carbinol group and the functional group equivalent is less than or equal to 4500 g/mol, and it is more preferable that the component (A-2) include polydimethylsiloxane in which one terminal is modified with a mercapto group.

When a compound having the features of both components (A-1) and (A-2) and a compound satisfying only the feature of component (A-2) are used in combination, the former is categorized into component (A-1) and the latter into component (A-2). Note that there may further be a nonreactive organic group in the molecular chain of the silicone oil (for example, in a side chain, at another terminal, or the like) to the extent that the action of the present invention is not inhibited.

It is presumed that, by virtue of the fact that the component (A-2) has a functional group selected from the group consisting of a mercapto group, an amino group, and a carbinol group (hereinafter, also referred to as a reactive functional group), a cured coating film formed from the coat-forming composition of the present invention can have both suitable water sliding ability and durability (water sliding ability after abrasion).

Although the mechanism by which the action mentioned above is exhibited is not clear, the following mechanism is inferred. The component (A-2) has a structure of having the reactive functional group mentioned above at one terminal of a silicone oil; the reactive functional group can interact with a base material made of a metal etc., and one end of the molecule adsorbs on the base material. This forms a monomolecular layer standing in rows on the surface of the base material to form a hydrophobic film, and to exhibit water sliding ability. Further, it is surmised that, by the interaction of the component (A-2) with the base material, and the complementary film formation of the component (A-2) and component (A-1), a dense coating film excellent in durability (abrasion resistance) is obtained and the action of the present invention can be exhibited.

When the reactive functional group is a carbinol group, interaction with a base material (for example, a steel plate or a coated steel plate) is weaker than a mercapto group or an amino group, and some level of concentration of functional groups would be needed; thus, the functional group equivalent is specified to less than or equal to 4500 g/mol (that is, the hydroxyl value of more than or equal to 12.4 mg KOH/g). Further, even for one having a carbinol group with the functional group equivalent mentioned above at one terminal, in the case of having a plurality of carbinol groups on the Si atom at one terminal, the carbinol groups would crosslink between molecules, to reduce adsorbability on the base material. Thus, the reactive silicone oil having is defined to have a monocarbinol group at one terminal (that is, only one carbinol group links to the Si atom at one terminal).

Note that the mechanism mentioned above is only a presumption, and whether this is right or wrong does not influence the technical scope of the present invention.

As the component (A-2), either a synthetic product or a commercially available product may be used as long as it is one having the characteristics mentioned above. As the commercially available product, for example, X-22-170BX (manufactured by Shin-Etsu Chemical Co., Ltd.; a silicone oil in which one terminal is modified with a monocarbinol group; the functional group equivalent: 2800 g/mol), MCR-A11 (manufactured by Gelest, Inc.; a silicone oil in which one terminal is modified with an amino group), and the like can be used. These may be used singly, or a plurality of kinds may be used in combination.

In the coat-forming composition of the present invention, the (A) component contains the components (A-1) and (A-2) at a mass ratio in the range of (A-1): (A-2)=1:1.1 to 1:4.9. If the mass ratio of the component (A-2) to the component (A-1) is smaller than the range mentioned above (for example, (A-1):(A-2)=1:1 or the like) and if the mass ratio of the component (A-2) to the component (A-1) is larger than the range mentioned above (for example, (A-1): (A-2)=1:5 or the like), both water sliding ability and water resistance (water sliding ability after abrasion) are poor. The mass ratio is preferably in the range of 1:1.5 to 1:4.5, more preferably in the range of 1:1.8 to 1:4.2, still more preferably in the range of 1:2.0 to 1:4.0, and particularly preferably in the range of 1:2.5 to 1:3.5. By the mass ratio between the component (A-1) and the component (A-2) being in the range mentioned above, when a cured coating film is formed from the coat-forming composition, both water sliding ability and durability can be achieved at a desirable level.

<Component (B)>

The component (B) contained in the coat-forming composition of the present invention is a hydrolysis catalyst, and is a compound for reacting the hydrolyzable group (preferably Si—OR$^2$) contained in the component (A-1) with moisture or the like in the air to perform condensation reaction.

As the component (B), a conventionally known compound may be selected for use, as appropriate; for example, a compound of necessary characteristics may be selected for use from the viewpoints of reaction activity, storage stability, colorability, etc. from organic tin compounds, organic zinc compounds, organic titanium compounds, organic zirconium compounds, organic aluminum compounds, organic nickel compounds, inorganic acid compounds, organic acid compounds, inorganic base compounds, organic base compounds, and the like.

As the organic tin compound, dibutyltin dilaurate, dibutyltin dioctate, dibutyltin diacetate, dioctyltin dilaurate, dioctyltin dioctate, dioctyltin diacetate, dibutyltin bis(acetylacetate), dioctyltin bis(acetyllaurate), and the like can be cited as examples.

As the organic zinc compound, zinc triacetylacetonate, zinc 2-ethylhexoate, zinc naphthenate, zinc stearate, and the like can be cited as examples.

As the organic titanium compound, tetrabutyl titanate, tetranonyl titanate, tetrakis(ethylene glycol methyl ether) titanate, tetrakis(ethylene glycol ethyl ether) titanate, bis (acetylacetonyl)dipropyl titanate, and the like can be cited as examples.

As the organic zirconium compound, zirconium tetraacetylacetonate, zirconium tributoxyacetylacetonate, zirconium dibutoxydiacetylacetonate, zirconium tetra-normal-propoxide, zirconium tetraisopropoxide, zirconium tetra-normal-butoxide, zirconium acylate, zirconium tributoxystearate, zirconium octoate, zirconyl 2-ethylhexanoate, zirconium 2-ethylhexoate, and the like can be cited as examples.

As the organic aluminum compound, aluminum salt compounds such as aluminum octylate, aluminum triacetate and aluminum tristearate, aluminum alkoxide compounds such as aluminum trimethoxide, aluminum triethoxide, aluminum triallyloxide and aluminum triphenoxide, aluminum chelate compounds such as aluminum methoxy bis(ethylacetoacetate), aluminum methoxy bis(acetylacetonate), aluminum ethoxy bis(ethylacetoacetate), aluminum ethoxy bis(acetylacetonate), aluminum isopropoxy bis(ethylacetoacetate), aluminum isopropoxy bis(methyl acetoacetate), aluminum isopropoxy bis(t-butylacetoacetate), aluminum butoxy bis (ethylacetoacetate), aluminum dimethoxy (ethylacetoacetate), aluminum dimethoxy (acetylacetonate), aluminum diethoxy (ethylacetoacetate), aluminum diethoxy (acetylacetonate), aluminum diisopropoxy (ethylacetoacetate), aluminum diisopropoxy (methylacetoacetate), aluminum tris (ethylacetoacetate), aluminum tris(acetylacetonate) and aluminum octylacetoacetate diisopropylate, and the like can be cited as examples.

As the organic nickel compound, nickel(II) acetylacetonate, nickel(II) hexafluoroacetylacetonate hydrate, and the like can be cited as examples.

As the inorganic acid compound, compounds such as hydrochloric acid, phosphoric acid, sulfuric acid, hydrofluoric acid, and the like can be cited as examples. As the organic acid compound, compounds such as p-toluenesulfonic acid, oxalic acid, and the like can be cited as examples. As the inorganic base compound, compounds such as ammonia, sodium hydroxide, and the like can be cited as examples. As the organic base compound, compounds such as tributylamine, 1,5-diazabicyclo[4.3.0]nonene-5 (DBN), 1,8-diazabicyclo[5.4.0]undecene-7 (DBU), and the like can be cited as examples. The inorganic acid compound and the organic acid compound may be in a salt or ester form.

The component (B) may be used singly, or a plurality of kinds may be used in combination.

In the present invention, from the viewpoint of colorability over time to the coat-forming composition, the component (B) is preferably an inorganic acid compound, and a phosphoric acid compound is more preferable and phosphoric acid or an ester thereof is particularly preferable from the viewpoint of improving the effect of the present invention more.

The upper limit of the content of the (B) component in the coat-forming composition of the present invention, from the viewpoint of storage stability, is preferably less than or equal to 20 mass %, more preferably less than or equal to 15 mass %, and still more preferably less than or equal to 10 mass %, relative to the (A-1) component. Further, the lower limit of the content of the (B) component, from the viewpoint of sufficiently advancing the condensation reaction of the component (A-1) to obtain a cured coating film excellent in the effect of the present invention, is preferably more than or equal to 0.1 mass %, more preferably more than or equal to 0.5 mass %, and still more preferably more than or equal to 1 mass %, relative to the (A-1) component.

<Component (C)>

The component (C) contained in the coat-forming composition of the present invention is an organic solvent. The component (C) is a component necessary to uniformly dissolve and dilute the component (A) and the component (B) and cause these components to form a thin film.

A boiling point of the component (C) in the present invention is preferably 40 to 155° C., more preferably 55 to 120° C., and still more preferably 70 to 100° C. By the boiling point being in the range mentioned above, volatility when turning the coat-forming composition into a coating film is made adequate, and useless interaction does not occur on the component (A) or the component (B); thus, a dense coating film with no unevenness can be formed.

As the component (C), hydrocarbon compounds such as solvent naphtha, n-hexane, i-hexane, cyclohexane, ethylcyclohexane, methylcyclohexane, n-heptane, i-octane, n-maldecane, n-malpentane, propylcyclohexane, 1,3,5-trimethylcyclohexane, 1,2,3-trimethylcyclohexane, 1,2,4-trimethylcyclohexane, cyclooctane, 1,1,3,5-tetramethylcyclohexane, cyclooctane, isododecane, toluene, xylenes, styrene, and the like; halogenated hydrocarbon compounds such as dichloromethane, trichloromethane, dichloroethanes, trichloroethanes, tetrachloroethanes, dichloroethylenes, trichloroethylene, tetrachloroethylene, bromopropanes, and the like; alcohol compounds such as methanol, ethanol, n-propanol, i-propanol (isopropyl alcohol), n-butanol, i-butanol, t-butanol, cyclohexanol, butanediols, 2-ethyl-1-hexanol, benzyl alcohol, and the like; ketone compounds such as acetone, methyl ethyl ketone, methyl isobutyl ketone, diisobutyl ketone, cyclohexanone, diacetone alcohol, and the like; ester compounds such as ethyl acetate, methyl acetate, butyl acetate, sec-butyl acetate, methoxybutyl acetates, amyl acetate, normal-propyl acetate, isopropyl acetate, ethyl lactate, methyl lactate, butyl lactate, and the like; and ether compounds such as diethyl ether, propyl ether, methyl ethyl ether, isopropyl ether, tetrahydrofuran, tetrahydropyran, methyl cellosolve, ethyl cellosolve, butyl cellosolve, 1,4-dioxane, and the like can be cited. These may be used singly, or a plurality of kinds may be used in mixture.

From the viewpoints of storage stability and workability (for example, volatility of a solvent and dryability of a coating film), preferred examples of the component (C) in the present invention includes at least one selected from the group consisting of an alcohol compound, a ketone compound, an ester compound, an ether compound, a hydrocarbon compound, and a halogenated hydrocarbon compound, more preferably includes an alcohol compound, and particularly preferably includes isopropyl alcohol.

In the coat-forming composition of the present invention, the content of the component (C) is in the range of 100 to 2000 parts by mass relative to 100 parts by mass of the component (A). If the content is less than 100 parts by mass or more than 2000 parts by mass, both water sliding ability and durability (abrasion resistance) are poor. The content is preferably in the range of 150 to 1500 parts by mass, more preferably in the range of 200 to 1000 parts by mass, and still more preferably 200 to 400 parts by mass. By being in the range mentioned above, the coat-forming composition of the present invention can contain effective components in appropriate concentrations in a treatment liquid before applying, and can be applied to the base material in an adequate amount during laying and thus, a dense coating film can be formed. Accordingly, the coat-forming composition of the present invention can be advantageous in water resistance (water sliding ability after abrasion).

<Other Components>

The coat-forming composition according to the present invention may contain an additive, unless the properties are damaged. Examples of such additive include, for example, adhesion imparting agents such as reactive or non-reactive silicone oils, alkoxysilane compounds and silane coupling agents that are not involved in the component (A), anti-aging agents, corrosion inhibitors, coloring agents, surfactants, rheology modifiers, ultraviolet absorbers, infrared absorbers, fluorescence agents, polishing agents, perfumes, fillers and the like. These components can be selected depending to purpose.

[Method for Producing Coat-Forming Composition]

The coat-forming composition according to the present invention can be manufactured by mixing the components mentioned above at a prescribed ratio. To be specific, according to another aspect of the present invention, there is provided a method for producing a coat-forming composition, which method comprises mixing (A-1) a hydrolyzable group-containing silicone oligomer having a kinematic viscosity at 25° C. of 10 $mm^2s^{-1}$ or less, (A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less, (B) a hydrolysis catalyst, and (C) an organic solvent, wherein the (A-1) and the (A-2) are mixed at a mass ratio of (A-1):(A-2)=1:1.1 to 1:4.9, and the coat-forming composition contains 100 to 2000 parts by mass of the (C) relative to 100 parts by mass as a total amount of the (A-1) and the (A-2).

An addition order, addition method, etc. of the components are not particularly limited. Further, a mixing method and a mixing time are not particularly limited, either, and a technique known by a person skilled in the art may be used. As a description regarding preferred composition ratios (mass ratios) of each component and the kind, structure, etc. of each compound in the method, the description in the section of [Coat-forming composition] above is quoted.

[Use of Coat-Forming Composition]

The coat-forming composition of the present invention can be applied to a base materials such as various metals, glass, ceramics, resins, etc. In particular, it can be advantageously applied to a metal steel plate, and a metal steel plate provided with a coating and a glass surface, and particularly advantageously applied to a coated steel plate for an exterior of an automobile (in the present description, also referred to as an automotive exterior steel plate). That is, in the preferred embodiment of the present invention, the coat-forming composition is used for forming a coating film on a surface of a steel plate or a coated steel plate. Further, in the more preferred embodiment, the steel plate or the coated steel plate mentioned above is a car body of an automobile.

Further, according to another embodiment of the present invention, a coating film formation method using the coat-forming composition is provided. The method for forming a coating film of the present invention includes applying the coat-forming composition to a surface of a steel plate or a coated steel plate (preferably a car body of an automobile), volatilizing the (C) at normal temperature or in a heated environment; and then further performing dry wiping, or further performing water wiping and then performing dry wiping.

In the present description, the "normal temperature" refers to a temperature in a room temperature environment in which temperature adjustment by air conditioning or the like is not made, and refers to almost approximately 15 to 25° C. Further, in the present description, the "heated environment" refers to an environment heated by air conditioning, a heater (a heat ray irradiation means), or the like, a constant temperature environment set at a high temperature (for example, still standing in a constant temperature room), or the like, and refers to an environment higher than a room temperature (approximately more than or equal to 40° C.)

In the present invention, a method in which the coat-forming composition is applied to a surface of a steel plate or a coated steel plate, further water wiping is performed, and then dry wiping is performed (that is, the latter process) may be employed, or a method in which the coat-forming composition is applied to a surface of a steel plate or a coated steel plate, and then only dry wiping is performed (that is, the former process) may be employed. By either of the processes, a cured coating film having good characteristics can be obtained. Thus, the coat-forming composition and the coating film formation method according to the present invention has a feature in excellent workability during laying.

An application means at the time of coating film formation of the coating film formation method (a method for applying the coat-forming composition) is not particularly limited, and an arbitrary application means may be used as appropriate, such as, for example, hand painting using fibers impregnated with the composition, brush painting, machine application using an automated machine, etc. In the present invention, the following method can be suitably used. That is, in the preferred embodiment of the coating film formation method of the present invention, a fiber such as of a dry sponge, waste cloth, or the like is impregnated with a suitable amount of the coat-forming composition according to the present invention, the impregnated coat-forming composition is thinly painted and spread with a hand on a surface of a steel plate or a coated steel plate (a base material), and naturally dried or forcedly dried using a dryer or the like to vaporize a volatile component. At this time, the component (A), which is a reaction component contained in the coat-forming composition, comes into contact with moisture in the air, and hydrolysis reaction progresses by the action of the hydrolysis catalyst (B), in parallel with the vaporization of the volatile component, crosslinking curing occurs on the steel plate or the coated steel plate (base material), and a resin-like cured substance is formed. After that, the cured substance is dry-wiped with a dry cloth or the like to obtain a coating film layer formed of a uniform cured coating film on the surface of the base material.

In a conventionally known coating film formation method, a process of performing water wiping after the vaporization of the volatile component or a post-process that is a process of separately performing surface treatment with a treatment liquid for wiping-up and then performing dry wiping with a dry cloth has been needed during laying. Here, these post-processes may be performed also in the coating film formation method of the present invention. However, by the coating film formation method of the present invention, a uniform cured coating film can be obtained at once by simply performing dry wiping treatment with a dry cloth after solvent vaporization. Accordingly, the coating film formation method according to the present invention is very excellent in workability.

Further, according to another aspect of the present invention, a cured coating film obtained by curing the coat-forming composition is provided. The cured coating film formed by using the coat-forming composition is excellent in water sliding ability and durability (abrasion resistance).

The cured coating film according to the present invention is preferably in a thin film form, and a film thickness is preferably 0.002 to 75 µm, more preferably 0.01 to 50 µm, and still more preferably 0.05 to 10 µm. By the film thickness of the cured coating film being in the range mentioned above, good water sliding characteristics, workability during laying, and abrasion resistance can be improved together.

Thus, according to the present invention, a means for forming a cured coating film excellent in water sliding ability and durability (water sliding ability after abrasion) can be provided. The present invention is useful in forming a coating film for imparting water sliding ability, durability, etc. particularly to a steel plate or a coated steel plate, such as a metal surface or a coated surface of a car body of an automobile or a train vehicle.

In the following, the effects of the present invention is described in detail by using Examples. However, these Examples do not intend to limit aspects of the present invention.

EXAMPLES

The present invention will now be described in more detail by using Examples and Comparative Examples below. However, the technical scope of the present invention is not limited to Examples below. Note that, unless otherwise specified, the following operation and measurement of physical properties etc. were performed under conditions of room temperature (in the range of 20° C. to 25° C.) and a relative humidity of 40 to 50% RH.

Using the following methods, the evaluation of characteristics was performed on each coat-forming composition (hereinafter, also referred to simply as a "composition") prepared in each of Examples and Comparative Examples. Further, the method for preparing each coat-forming composition is as follows.

[Method for Fabricating Test Piece]

Each composition was caused to permeate in an enough amount (approximately 2 mL) for half of the surface of tissue paper to become wet. Each composition was thinly painted and spread with a hand by using the tissue paper mentioned above on a black coated sheet (material: SPCC-SD (a cold rolled steel plate); standard: JIS G 3141:2017; dimensions: 0.8 mm×70 mm×150 mm; a piece obtained by performing chemical conversion electrodeposition and then performing amino-alkyd black coating on one surface; manufactured by Asahi-Betechno K.K.). The resulting piece was allowed to stand still in a room at 25° C. for 10 minutes, then the surplus composition was wiped off with a dry microfiber cloth, and still standing was performed in a 25° C. room for 2 weeks for maturation, to obtain a test piece having, on a surface, a cured coating film of the coat-forming composition (film thickness: approximately 0.01 to 100 µm).

[Evaluation Method of Water Sliding Ability]

One drop (approximately 0.005 ml) of purified water was dropped onto a surface provided with the cured coating film of the test piece, and the test piece was gradually inclined from a horizontal state. The evaluation of water sliding ability (water sliding-down ability) was performed by taking, as a water sliding angle, an angle at which the water drop started to flow. If the water sliding angle is less than or equal to 10° and preferably less than or equal to 7°, the test piece can be said to be excellent in water sliding ability.

[Evaluation Method of Durability]

Using a simple friction tester (a product of Imoto Seisakusho), abrasion was given to a surface provided with the cured coating film of the test piece by performing 100 strokes with a rate of 30 times/minute and a movement distance of 100 mm with a friction body of a load of 500 g, and a water sliding angle of the surface after the abrasion was measured by the same method as above. If the measured water sliding angle is less than or equal to 15° and preferably less than or equal to 10°, the test piece can be said to be excellent in durability (water sliding ability after abrasion).

Here, a 20 mm-diameter stainless steel round column that was wound with a material obtained by causing distilled water to sufficiently soak through a 40 mm-wide piece of dry, clean fabric (water-absorbing cloth made of cellulose/cotton composite fiber; a product of zThreeBond Co., Ltd., "ThreeBond 6644E") was used as the friction body used for the test; the round column was placed such that the axis of the round column is in the direction orthogonal to the sliding direction, and the friction body was slid.

[Preparation of Composition]

The following materials were used as the raw materials to be contained in each of the compositions of Examples and Comparative Examples. Each material was weighed out so as to obtain the mass written in the following Table, and mixed at 25° C. for 30 minutes by using a Three-One Motor of Shinto Scientific Co., Ltd., to obtain a composition. Note that the unit of each component in the following Table is "parts by mass". Note that, in regard to a raw material containing a component corresponding to the (B) in the (A-1) component, conversion was performed to the masses of the (A-1)-corresponding component and the (B)-corresponding component, and each mass was written separately in the corresponding section in the Table.

<Component (A)>
Component (A-1):

X-40-2327: Mixture (manufactured by Shin-Etsu Chemical Co., Ltd.) of a partial hydrolysis condensate of an alkoxysilane compound in which both $R^1$ and $R^2$ are a methyl group and x is an integer of 0 to 3 in the Formula (1), and which has a weight-average molecular weight of 550 to 20,000 and a kinematic viscosity at 25° C. of 0.6 $mm^2s^{-1}$, and a hydrolysis catalyst made of a phosphoric acid-based compound (X-40-2309A, a product of Shin-Etsu Chemical Co., Ltd.) in a concentration of 30 mass % relative to the condensate that had been mixed together in advance KR-515: Partial hydrolysis condensate of an alkoxysilane compound in which both $R^1$ and $R^2$ are a methyl group and x is an integer of 0 to 3 in the Formula (1), and which has a weight-average molecular weight of 550 to 20,000 and a kinematic viscosity at 25° C. of 7 $mm^2s^{-1}$ (manufactured by Shin-Etsu Chemical Co., Ltd.)

Component (A'-1) (a Comparative Component of Component (A-1)):

KR-401: Mixture (manufactured by Shin-Etsu Chemical Co., Ltd.) of a partial hydrolysis condensate of an alkoxysilane compound in which all $R^1$'s are a methyl group and a phenyl group, $R^2$ is a methyl group, and x is an integer of 0 to 3 in the Formula (1), and which has a kinematic viscosity at 25° C. of 14 $mm^2s^{-1}$, and a hydrolysis catalyst made of a titanium-based compound (DX-175, a product of Shin-Etsu Chemical Co., Ltd.) in a concentration of 5 mass % relative to the condensate that had been mixed together in advance Component (A-2) component:

X-22-170BX: Reactive silicone oil having a monocarbinol group at one terminal (polydimethylsiloxane having one terminal modified with one carbinol group (—$C_3H_6OC_2H_4OH$)); the functional group equivalent: 2800 g/mol (manufactured by Shin-Etsu Chemical Co., Ltd.)

Amine: Reactive silicone oil having an amino group at one terminal (polydimethylsiloxane having one terminal modified with an amino group), manufactured by the following method: 100 g of X-22-170BX mentioned above was mixed with 1 liter of toluene solvent and then the mixture was introduced into a flask, 12 g of 3-aminopropyldimethylmethoxysilane was added thereto, stirred for 5 minutes, and then 0.1 g of dihexylamine and 0.1 g of 2-ethylhexanoic acid were added as catalysts, stirred at 60° C. for 2 hours to perform the reaction, the temperature was returned to normal temperature, and then the solvent was vaporized, and further impurities were removed by cleaning to perform purification Thiol: Reactive silicone oil having a mercapto group at one terminal (polydimethylsiloxane having one terminal modified with a mercapto group), manufactured by the following method: 100 g of X-22-170BX mentioned above was mixed with 1 liter of toluene solvent and then the mixture was introduced into a flask, 12 g of 3-mercaptopropyldimethymethoxylsilane was added thereto, stirred for 5 minutes, and then 0.1 g of dihexylamine and 0.1 g of 2-ethylhexanoic acid were added as catalysts, stirred at 60° C. for 2 hours to perform the reaction, the temperature was returned to normal temperature, and then the solvent was vaporized, and further impurities were removed by cleaning to perform purification Component (A'-2) component (a comparative component of component (A-2)):

X-22-170DX: Reactive silicone oil having a monocarbinol group at one terminal; the functional group equivalent: 4670 g/mol (manufactured by Shin-Etsu Chemical Co., Ltd.)

X-22-176DX: Reactive silicone oil having a diol group at one terminal; the functional group equivalent: 1600 g/mol (manufactured by Shin-Etsu Chemical Co., Ltd.)

KF-6003: Reactive silicone oil having a monocarbinol group at both terminals; the functional group equivalent: 2500 g/mol (manufactured by Shin-Etsu Chemical Co., Ltd.)

<Component (B)>:
X-40-2309A: Phosphoric acid-based compound (manufactured by Shin-Etsu Chemical Co., Ltd.)

DX-175: Titanium-based compound (manufactured by Shin-Etsu Chemical Co., Ltd.)

<Component (C)>:
Isopropyl alcohol (a reagent).

TABLE 1

| | | Example 1 | Example 2 | Example 3 | Example 4 | Example 5 | Example 6 |
|---|---|---|---|---|---|---|---|
| (A-1) | X-40-2327 | 1 | 1 | 1 | | | |
| | KR-515 | | | | 1 | 1 | 1 |
| (A-2) | X-22-170BX | 3 | | | 3 | | |
| | Amine | | 3 | | | 3 | |
| | Thiol | | | 3 | | | 3 |
| (B) | X-40-2309A | 0.05 | 0.05 | 0.05 | 0.05 | 0.05 | 0.05 |
| (C) | IPA | 10 | 10 | 10 | 10 | 10 | 10 |
| (A-1):(A-2) (mass ratio) | | 1:3.0 | 1:3.0 | 1:3.0 | 1:3.0 | 1:3.0 | 1:3.0 |
| ((A-1) + (A-2)):(C) (mass ratio) | | 100:250 | 100:250 | 100:250 | 100:250 | 100:250 | 100:250 |
| | Water sliding ability [°] | 6.2 | 6.8 | 5.5 | 9.6 | 8.6 | 8.0 |
| | Durability [°] | 7.8 | 7.4 | 7.0 | 12.0 | 10.4 | 12.0 |

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| (A-1) | X-40-2327 | 1 | 1 | | | | |
| (A'-1) | KR-401 | | | | | 1 | 1 |

TABLE 2-continued

|  |  |  |  |  |  |  |  |
|---|---|---|---|---|---|---|---|
| (A-2) | X-22-170BX | 1 | 5 | 3 |  | 3 |  |
|  | amine |  |  |  |  |  | 3 |
|  | thiol |  |  |  | 3 |  |  |
| (A'-2) | X-22-170DX |  |  |  |  |  |  |
|  | X-22-176DX |  |  |  |  |  |  |
|  | KF-6003 |  |  |  |  |  |  |
| (B) | X-40-2309A | 0.05 | 0.05 | 0 | 0 |  |  |
|  | DX-175 |  |  |  |  | 0.05 | 0.05 |
| (C) | IPA | 10 | 10 | 10 | 10 | 10 | 10 |
| (A-1) or (A'-1):(A-2) or (A'-2) (mass ratio) |  | 1:1.0 | 1:5.0 | 0:3.0 | 0:3.0 | 1:3.0 | 1:3.0 |
| [(A-1) or (A'-1)] + [(A-2) or (A'-2)]:(C) (mass ratio) |  | 100:500 | 100:167 | 100:333 | 100:333 | 100:250 | 100:250 |
| Water sliding [°] ability |  | 19.8 | 15.5 | 21.9 | 24.8 | 25.5 | 31.0 |
| Durability [°] |  | 31.1 | 18.0 | 35.3 | 35.2 | 32.0 | 39.8 |

|  |  | Comparative Example 7 | Comparative Example 8 | Comparative Example 9 | Comparative Example 10 | Comparative Example 11 |
|---|---|---|---|---|---|---|
| (A-1) | X-40-2327 |  | 1 | 1 | 1 | 1 |
| (A'-1) | KR-401 | 1 |  |  |  |  |
| (A-2) | X-22-170BX |  |  |  |  |  |
|  | amine |  |  |  |  |  |
|  | thiol | 3 |  |  |  |  |
| (A'-2) | X-22-170DX |  |  | 3 |  |  |
|  | X-22-176DX |  |  |  | 3 |  |
|  | KF-6003 |  |  |  |  | 3 |
| (B) | X-40-2309A |  | 0.05 | 0.05 | 0.05 | 0.05 |
|  | DX-175 | 0.05 |  |  |  |  |
| (C) | IPA | 10 | 10 | 10 | 10 | 10 |
| (A-1) or (A'-1):(A-2) or (A'-2) (mass ratio) |  | 1:3.0 | 1:0 | 1:30 | 1:30 | 1:30 |
| [(A-1) or (A'-1)] + [(A-2) or (A'-2)]:(C) (mass ratio) |  | 100:250 | 100:1000 | 100:250 | 100:250 | 100:250 |
| Water sliding [°] ability |  | 17.8 | 44.0 | 39.0 | x | 29.8 |
| Durability [°] |  | 20.8 | 50 or more | 44.5 | x | 35.6 |

As shown in Table 1, it was confirmed that both water sliding ability and durability are good in Examples 1 to 6 (compositions each containing components (A) to (C) at a prescribed composition ratio of the present invention). Further, in Examples 1 to 6, separation-sedimentation of contained components was not observed when preparing the composition. In particular, further improvements in water sliding ability and durability were seen in Examples 1 to 3, which used component (A-1) having a lower kinematic viscosity than those of Examples 4 to 6.

On the other hand, as shown in Table 2, it was found that all the results of evaluation of water sliding ability and durability in Comparative Examples 1 and 2 (compositions of combinations in each of which the mass ratio between (A-1) and (A-2) is deviated from the range of the present invention), Comparative Examples 3 and 4 (compositions each containing no (A-1)-corresponding component of the present invention), Comparative Examples 5 to 7 (compositions in each of which a hydrolyzable group-containing silicone oligomer having a kinematic viscosity outside the range of the present invention is used in place of (A-1) of the present invention), Comparative Example 8 (a composition containing no (A-2)-corresponding component of the present invention), and Comparative Examples 9 to 11 (compositions in each of which the (A-2)-corresponding component of the present invention is replaced with a compound having no chemical structure specified in the present invention) are significantly reduced as compared to the results of the combination of the present invention. Note that Comparative Example 10, in which a reactive silicone oil having a diol group at one terminal is used as the (A-2)-corresponding component instead, was not subjected to the evaluation of each characteristic because the contained components did not sufficiently mix during the preparation of the composition and separation-sedimentation had occurred.

The coat-forming composition of the present invention is one by which a coating film after curing is allowed to have excellent characteristics, and is a useful one that can be suitably used to form a thin-film coating for providing protection ability particularly to a metal surface, a coated surface, a resin surface, or the like of a car body of an automobile or a train vehicle.

The present application is based on Japanese Patent Application No. 2017-143605 filed on Jul. 25, 2017, the disclosure of which is hereby referred to and incorporated as a whole.

The invention claimed is:

1. A coat-forming composition comprising (A), (B), and (C) below, and containing 100 to 2000 parts by mass of (C) below relative to 100 parts by mass of (A) below, comprising:

(A) a mixture of coating film-forming components containing (A-1) and (A-2) below at a mass ratio of (A-1):(A-2)=1:1.1 to 1:4.9,
  (A-1) a hydrolyzable group-containing silicone oligomer having a kinematic viscosity at 25° C. of 10 mm²/s or less, and
  (A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less;
(B) a hydrolysis catalyst; and
(C) an organic solvent.

2. The coat-forming composition according to claim 1, wherein the (A-1) is a partial hydrolysis condensate of an alkoxysilane compound represented by Formula (1) below which has a kinematic viscosity at 25° C. of 10 mm²/s or less:

$$R1x\text{-}Si(OR2)4\text{-}x \qquad \text{Formula (1)}$$

wherein R1 and R2 each independently represent an aliphatic hydrocarbon group having 1 to 8 carbon atoms, an alicyclic hydrocarbon group having 3 to 10 carbon atoms, or an aromatic hydrocarbon group having 6 to 10 carbon atoms that optionally has a substituent, and x is an integer of 0 to 3.

3. The coat-forming composition according to claim 1, wherein (C) includes at least one selected from the group consisting of an alcohol compound, a ketone compound, an ester compound, an ether compound, a hydrocarbon compound, and a halogenated hydrocarbon compound.

4. The coat-forming composition according to claim 1, wherein (C) includes an alcohol compound.

5. The coat-forming composition according to claim 1, wherein (B) is a phosphoric acid compound.

6. The coat-forming composition according to claim 1, wherein the coat-forming composition is used for forming a coating film on a surface of a steel plate or a coated steel plate.

7. The coat-forming composition according to claim 6, wherein the steel plate or the coated steel plate is a car body of an automobile.

8. The coat-forming composition of claim 1, wherein the coat forming composition is cured to form a cured coating film.

9. A method for forming a coating film comprising:
applying a coat-forming composition comprising (A), (B), and (C) below, and containing 100 to 2000 parts by mass of (C) below relative to 100 parts by mass of (A) below, comprising:
(A) a mixture of coating film-forming components containing (A-1) and (A-2) below at a mass ratio of (A-1):(A-2)=1:1.1 to 1:4.9,
  (A-1) a hydrolyzable group-containing silicone oligomer having a kinematic viscosity at 25° C. of 10 mm²/s or less, and
  (A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less;
(B) a hydrolysis catalyst; and
(C) an organic solvent,
to a surface of a car body of a steel plate or a coated steel plate;
volatilizing the (C) at normal temperature or in a heated environment; and
then further performing dry wiping, or further performing wiping with water and then performing dry wiping.

10. The method according to claim 9, wherein the steel plate or the coated steel plate is a car body of an automobile.

11. A method for manufacturing a coat-forming composition,
the method comprising mixing
(A-1) a hydrolyzable group-containing silicone oligomer having a kinematic viscosity at 25° C. of 10 mm²/s or less,
(A-2) a reactive silicone oil having, at one terminal, a functional group selected from the group consisting of a mercapto group, an amino group, and a monocarbinol group, provided that the reactive silicone oil having a monocarbinol group at one terminal has a functional group equivalent of 4500 g/mol or less,
(B) a hydrolysis catalyst, and
(C) an organic solvent,
wherein the method includes mixing the (A-1) and the (A-2) at a mass ratio of (A-1):(A-2)=1:1.1 to 1:4.9, and
the coat-forming composition contains 100 to 2000 parts by mass of the (C) relative to 100 parts by mass as a total amount of the (A-1) and the (A-2).

* * * * *